United States Patent
Zhang et al.

(10) Patent No.: US 10,404,333 B2
(45) Date of Patent: Sep. 3, 2019

(54) DEVICE AND METHOD FOR CONTROLLING ANTENNA ELEMENTS OF AN ANTENNA ARRAY

(71) Applicant: Intel IP Corporation, Santa Clara, CA (US)

(72) Inventors: Yushu Zhang, Beijing (CN); Yuan Zhu, Beijing (CN); Qinghua Li, San Ramon, CA (US); Huaning Niu, Milpitas, CA (US); Bin Wen, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/777,725

(22) PCT Filed: Nov. 23, 2015

(86) PCT No.: PCT/CN2015/095256
§ 371 (c)(1),
(2) Date: May 21, 2018

(87) PCT Pub. No.: WO2017/088089
PCT Pub. Date: Jun. 1, 2017

(65) Prior Publication Data
US 2018/0351610 A1    Dec. 6, 2018

(51) Int. Cl.
*H04B 7/0417* (2017.01)
*H04B 7/0456* (2017.01)
*H04B 7/06* (2006.01)

(52) U.S. Cl.
CPC ......... *H04B 7/0417* (2013.01); *H04B 7/0456* (2013.01); *H04B 7/063* (2013.01); *H04B 7/0626* (2013.01); *H04B 7/0632* (2013.01)

(58) Field of Classification Search
CPC .. H04B 7/0626; H04B 7/0417; H04B 7/0452; H04B 7/0456
See application file for complete search history.

(56) References Cited

U.S. PATENT DOCUMENTS

| 1,033,473 A | 7/1912 | Ryan et al. |
| 1,049,197 A | 12/1912 | Bell |

(Continued)

FOREIGN PATENT DOCUMENTS

| CN | 1918815 A | 2/2007 |
| CN | 103347304 A | 10/2013 |

(Continued)

OTHER PUBLICATIONS

Taiwan Patent Office, Office Action issued for Taiwan Patent Application No. 104104562, 19 pages, dated May 19, 2016.

(Continued)

*Primary Examiner* — Ross Varndell
(74) *Attorney, Agent, or Firm* — Schiff Hardin LLP

(57) ABSTRACT

The disclosure relates to a device for controlling a plurality of antenna elements of an antenna array of a multi-input multi-output (MIMO) communication system, the device comprising: a communication handler configured to receive channel information from a first user equipment of a plurality of user equipments, the channel information indicating a communication channel quality of the first user equipment, and configured to receive quality of service (QoS) information indicating a QoS requirement for the first user equipment; and a controller configured to generate a plurality of weights for beamforming the plurality of antenna elements based on the channel information and based on the QoS information.

24 Claims, 6 Drawing Sheets

(56) References Cited

U.S. PATENT DOCUMENTS

| | | | |
|---|---|---|---|
| 1,918,815 A | 7/1933 | Klein | |
| 2,010,254 A | 8/1935 | Becker | |
| 2008/0260051 A1* | 10/2008 | Boccardi | H04B 7/0452 375/259 |
| 2010/0254325 A1 | 10/2010 | Narasimhan et al. | |
| 2013/0021941 A1* | 1/2013 | Zheng | H04W 28/16 370/252 |
| 2014/0294107 A1 | 10/2014 | Shin | |
| 2016/0072572 A1* | 3/2016 | Kang | H04B 7/0417 370/329 |
| 2017/0012359 A1* | 1/2017 | Jung | H01Q 3/30 |

FOREIGN PATENT DOCUMENTS

| | | |
|---|---|---|
| CN | 104919716 A | 9/2015 |
| TW | 201126986 A | 8/2011 |
| TW | 201334614 A | 8/2013 |

OTHER PUBLICATIONS

PCT International Search Report issued for PCT/CN2015/095256, 5 pgs., dated Aug. 5, 2016.

* cited by examiner

DEVICE AND METHOD FOR CONTROLLING ANTENNA ELEMENTS OF AN ANTENNA ARRAY

FIELD

The disclosure relates to a device and a method for controlling a plurality of antenna elements of an antenna array of a multi-input multi-output (MIMO) communication system, in particular a full dimensional (FD) MIMO system. In particular, the disclosure relates to systems and methods for Cross Layer Eigen based Beamforming in FD-MIMO systems.

BACKGROUND

In a full dimensional multi-input multi-output (FD-MIMO) communication system 100, e.g. as illustrated in FIG. 1, a 2-dimensional planar antenna array structure 101 may be used in which the antenna elements 104 may be placed in the vertical and horizontal direction. Each antenna element 104 generates a beam 102 for transmitting a radio signal to a mobile device or user equipment (UE) 103. The radio signal may be transmitted to the UE 103 by using more than one antenna elements 104 of the antenna array 101.

The total antenna number may exceed the number of eight, which is the maximum antenna port number supported in some mobile standards such as LTE up to Release 12 by the Channel State Information Reference Signal (CSI-RS). As a result of this CSI-RS antenna port number limitation, designing the closed loop CSI feedback for the FD-MIMO system becomes problematic.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
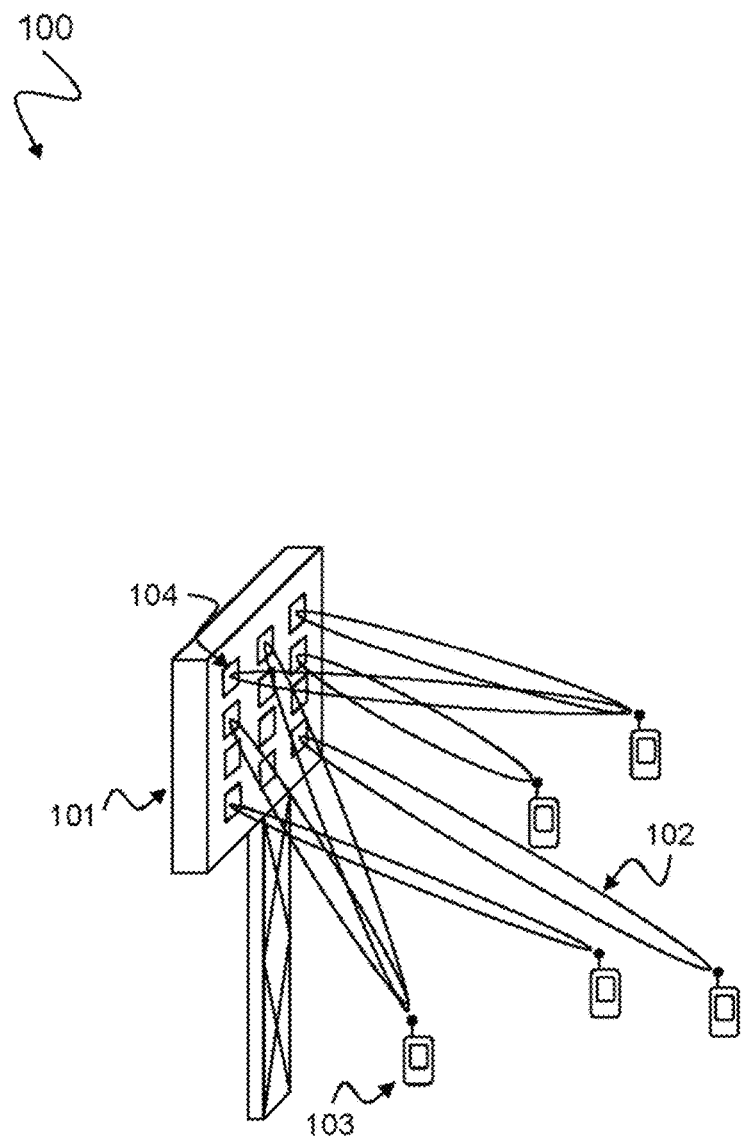
FIG. 1 is a schematic diagram illustrating a full dimensional multi-input multi-output (FD-MIMO) communication system 100.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
eNodeB,
eNB: base station,
MIMO: Multiple Input Multiple Output,
FD: Full Dimensional,
QoS: Quality of Service,
SRS: Sounding Reference Signal,
DFT: Discrete Fourier Transform,
EBB: Eigen Based Beamforming,
GBR: Guaranteed Bit Rate,
FTP: File Transfer,
PHY: physical layer
MAC: Media Access Control layer,
CDF: cumulative distribution function,
PMI: Precoding Matrix Indicator,
DRB: Data Radio Bearer,
SRB: Signal Radio Bearer,
QCI: QoS Class Identifier,
PELR: Packet Error Loss Rate,
PDB: Packet Delay Budget,
HoL: Head of Line,
BLER: Block Error Rate.

The methods and devices described herein may be based on devices for controlling antenna elements, e.g. controllers for radio cells, base stations, eNodeBs, etc. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular 4G and 5G, in particular LTE Release 14 and higher. The methods and devices described below may be implemented in network nodes and base stations. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof, in particular LTE Release 14 and higher. LTE (Long Term Evolution), marketed as 4G LTE and 5G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency resources. A diversity receiver uses two or more antennas to improve the quality and reliability of a wireless link.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

The methods and devices described herein after may be designed to generate a plurality of beamforming weights, in particular by generating a precoder matrix as described in the following.

In a FD-MIMO system, for example as depicted in FIG. 1, the frequency domain receiving signal model at subcarrier k may be according to equation (1)

$$Y_k = H_k P_c P_d X_k + N \qquad (1)$$

Where $H_k$ indicates the $N_r \times N_t$ channel matrix; $P_c P_d$ denotes the beamforming weight, in which $P_c$ is a $N_t \times N_p$ complex matrix (hereinafter referred to as first precoder matrix) and $P_d$ is a $N_p \times N_v$ complex matrix (hereinafter referred to as second precoder matrix); N refers to the additive Gaussian white noise. $N_r$ is the receiving antenna number, $N_t$ is the transmitting antenna number, $N_p$ is the transmitting antenna port number and $N_v$ is the layer number.

The second precoder matrix $P_d$ may be indicated by the User Equipment (UE) reporting the Precoding Matrix Indicator (PMI). In this disclosure, the main focus lies on generating the first precoder matrix $P_c$.

In the following, devices and methods using singular value decomposition are described. Singular value decomposition (SVD) is a factorization of a real or complex matrix. The singular value decomposition of an m×n real or complex matrix M is a factorization of the form M=UΣV*, where U denotes an m×m real or complex unitary matrix, Σ denotes an m×n rectangular diagonal matrix with non-negative real numbers on the diagonal, and V*, the conjugate transpose of V denotes an n×n real or complex unitary matrix. The diagonal entries $\Sigma_{i,i}$ of Σ are referred to as the singular values of M. The m columns of U and the n columns of V are referred to as the left-singular vectors and right-singular vectors of M, respectively.

In the following, methods and devices using QoS class identifier (QCI) are described. QoS Class Identifier (QCI) is a mechanism for ensuring that bearer traffic is allocated to an appropriate Quality of Service (QoS). Different bearer traffic requires different QoS and therefore different QCI values. In LTE, for example, the following nine different QCI values are specified: Conversational Voice (QCI=1), Conversational Video (QCI=2), Real Time Gaming (QCI=3), Non-Conversational Video with buffered streaming (QCI=4), IMS Signaling (QCI=5), TCP-based Video with buffered streaming, for example: www, email, chat, ftp, p2p and the like (QCI=6), live streaming of voice or video and interactive gaming (QCI=7), TCP-based buffered streaming of video, for example www, email, chat, ftp, p2p and the like (QCI=8) and TCP-based buffered streaming of video, for example www, email, chat, ftp, p2p and the like (QCI=9). QCIs ranging from 1 to 4 are associated with guaranteed bit rate (GBR) while QCIs ranging from 5 to 9 are associated with non-guaranteed bit rate (non-GBR) Every QCI (GBR and Non-GBR) is associated with a priority level. Priority level 1 is the highest priority level. If congestion is encountered, the lowest priority level traffic would be the first to be discarded.

Figure 2:
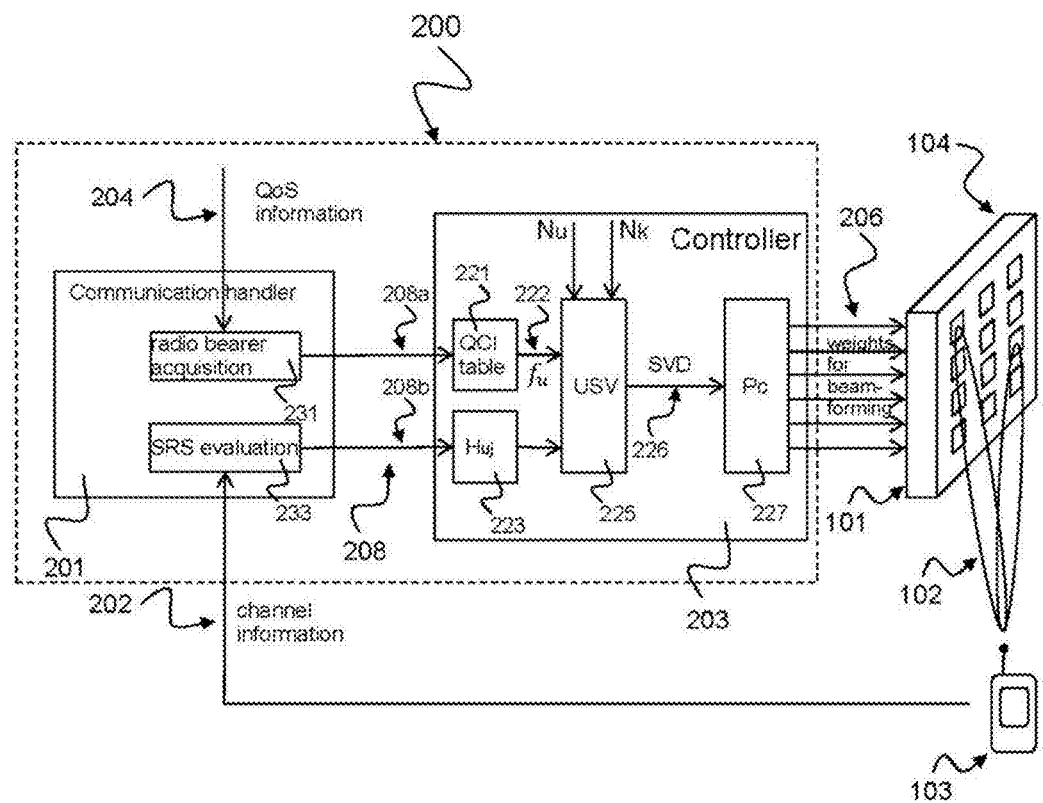
FIG. 2 is a schematic diagram illustrating an exemplary device 200 for controlling a plurality of antenna elements of an antenna array of a MIMO communication system.

FIG. 2 is a schematic diagram illustrating an exemplary device 200 for controlling a plurality of antenna elements 104 of an antenna array 101 of a MIMO communication system, e.g. a FD-MIMO communication system 100 as described above with respect to FIG. 1. The device 200 includes a communication handler 201 and a controller 203.

The communication handler 201 receives channel information 202 from a first user equipment 103 of a plurality of user equipments. The channel information 202 indicates a communication channel quality of the first user equipment 103. The communication handler 201 further receives quality of service (QoS) information 204 which indicates a QoS requirement for the first user equipment 103.

The controller 203 generates a plurality of weights 206 for beamforming the plurality of antenna elements 104 based on the channel information 202 and based on the QoS information 204.

The communication handler 201 may receive the QoS information 204 by acquiring 231 a Media Access Control (MAC) layer or a core network layer, i.e., a higher layer of the MIMO communication system 100. The communication handler 201 may receive the QoS information 204 from a radio bearer of the MIMO communication system 100 assigned to the first user equipment 103. The communication handler 201 may receive the QoS information 204 from a data radio bearer or a signal radio bearer. The communication handler 201 may receive the QoS information 204 from a QoS Class Identifier (QCI) comprised in the radio bearer.

The communication handler 201 may receive the channel information 202 from a physical layer of the MIMO communication system 100 assigned to the first user equipment 103. The communication handler 201 may receive the channel information 202 by evaluating 233 a Sounding Reference Signal (SRS) of the first user equipment 103, i.e., a signal transmitting a known reference pattern.

The controller 203 may generate a precoder matrix $P_c$, 227 comprising the plurality of weights 206. The precoder matrix $P_c$, 227 may correspond to the first precoder matrix $P_c$ as described above.

The controller 203 may generate the precoder matrix $P_c$, 227 depending on a number of antenna elements $N_t$ and a number of antenna ports $N_p$ of the antenna array 101. The controller 203 may generate the precoder matrix $P_c$, 227 based on a channel matrix 223 of the user equipment 103 and based on a scaling factor 222 of the QoS requirement for the first user equipment 103. The controller 203 may generate the precoder matrix $P_c$, 227 based on cross layer Eigen Based Beamforming EBB as described in the following.

The controller 203 may generate the precoder matrix $P_c$ based on the relation 225:

$$USV = \frac{1}{N_k N_u} \sum_{u=1}^{N_u} \sum_{j=1}^{N_k} f_u (H_{u,j})^H H_{u,j}$$

where $H_{u,j}$, 223 denotes the normalized frequency domain channel, i.e. the channel which total power is normalized to one, for the first user equipment 103 $u$ at subcarrier $j$, obtained by Sounding Reference Signal (SRS) 233, $N_k$ denotes the total SRS subcarrier number for the first user equipment 103, $N_u$ denotes the number of user equipments served by the antenna array 101 and $f_u$ denotes the scaling factor 222 of the QoS requirement for the first user equipment 103. The controller 203 may generate the precoder matrix $P_c$, 227 based on a singular value decomposition (SVD) 226 of the term USV, e.g. as described below with respect to FIG. 4.

The controller 203 may generate the precoder matrix ($P_c$) based on the first $N_p$ columns of the Eigen matrix $V^H$, e.g. as described below with respect to FIG. 4. $N_p$ denotes the number of antenna ports of the antenna array 101.

The controller 203 may generate the scaling factor 222 of the QoS requirement for the first user equipment 103 based on a QoS Class Identifier QCI table 221. The controller 203 may generate the scaling factor 222 of the QoS requirement for the first user equipment 103 based on a QoS Class Identifier (QCI) table 221 or based on a total number of radio bearers ($N_{RB}$) assigned to the first user equipment 103.

The controller 203 may generate the scaling factor 222 of the QoS requirement for the first user equipment 103 based on a Packet Error Lost Rate (PELR) or a Packet Delay Budget (PDB) of the first user equipment 103, e.g. as described below with respect to FIG. 4.

The controller 203 may generate the scaling factor 222 of the QoS requirement for the first user equipment 103 based on an outer-loop scaling adjustment factor. The outer-loop scaling adjustment factor may depend on a downlink channel quality index (CQI) and/or a block error rate BLER, e.g. as described below with respect to FIG. 4.

In a further example of the device 200 the communication handler 201 may receive channel information 202 from at least two User Equipments (UEs). The channel information 202 may indicate communication channel qualities of the at least two UEs 103. The received QoS information 204 may indicate QoS requirements for the at least two UEs 103. The controller 203 may generate a plurality of weights 206 for beamforming the plurality of antenna elements 104 based on the channel information 202 and based on the QoS information 204. The controller 203 may generate the plurality of weights 206 for beamforming the antenna elements 104 which may be antenna elements 104 of a two-dimensional antenna array structure 101 as schematically illustrated in FIG. 2. The antenna elements 104 may be placed in a vertical and a horizontal direction as schematically illustrated in FIG. 2. The controller 203 may generate the plurality of weights 206 based on cross layer beamforming.

The device 200 described in FIG. 2 is characterized by jointly considering user channel state information and Quality of Service (QoS) requirement as the factors for beamforming weight calculation. By user Sounding Reference Signal (SRS), its channel subspace may be obtained, which may be used to estimate current user beamforming weight. Meanwhile, in one eNodeB, due to active users may share the same beamforming weight from antenna port to physical antenna, a QoS weight factor may be used to balance different users' QoS requirements.

Figure 3:
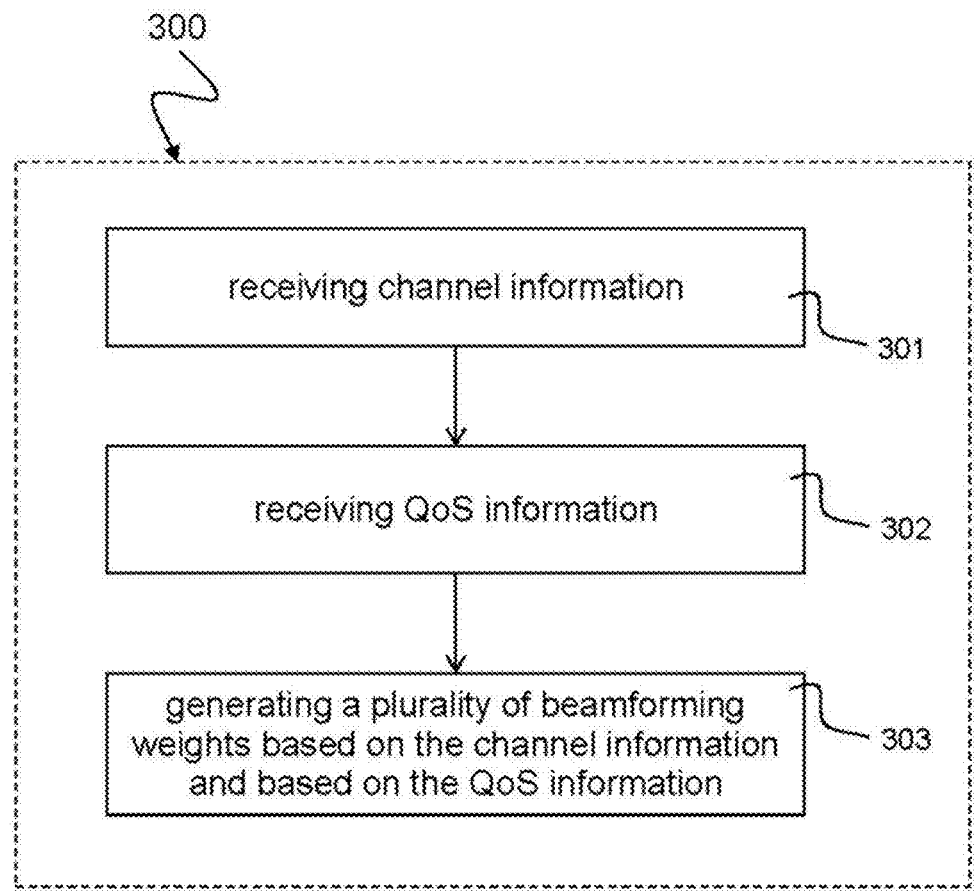
FIG. 3 is a schematic diagram illustrating an exemplary method 300 for controlling a plurality of antenna elements of an antenna array of a MIMO communication system.

FIG. 3 is a schematic diagram illustrating an exemplary method 300 for controlling a plurality of antenna elements of an antenna array of a MIMO communication system, e.g. a FD-MIMO communication system 100 as described above with respect to FIGS. 1 and 2.

The method 300 includes receiving channel information 301 from a plurality of user equipments, the channel information indicating communication channel qualities of the plurality of user equipment. The method 300 includes receiving quality of service (QoS) information 302 indicating QoS requirements for the plurality of user equipments. The method 300 includes generating a plurality of weights 203 for beamforming the plurality of antenna elements based on the channel information and based on the QoS information. The receiving 301 channel information and receiving 302 QoS information may correspond to the information reception tasks of the communication handler 201 as described above with respect to FIG. 2. The generating 203 the plurality of weights may correspond to the controller tasks of the controller 203 as described above with respect to FIG. 2.

The method 300 may further include receiving 301 the channel information for active UEs of the plurality of UEs from a physical layer of the MIMO communication system.

The method 300 may further include receiving 302 the QoS information for active radio bearers assigned to the plurality of UEs from a communication layer of the MIMO communication system which is higher than a physical layer, e.g. a MAC layer or a higher network layer.

Figure 4:
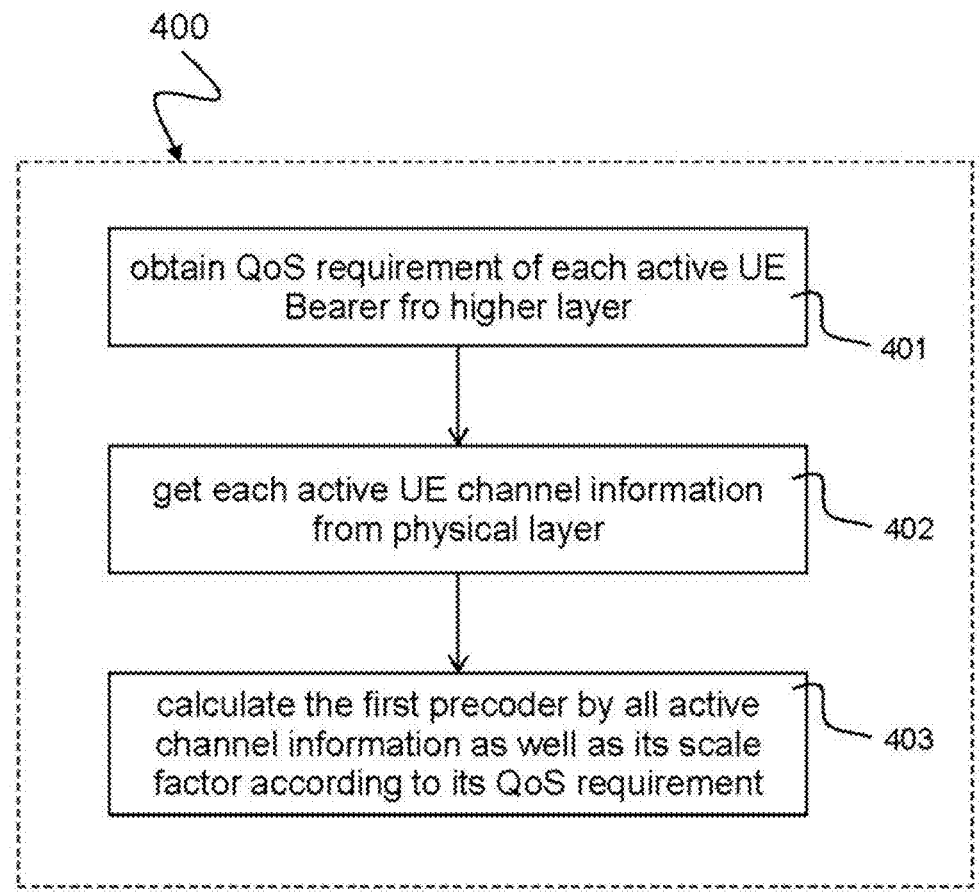
FIG. 4 is a schematic diagram illustrating an exemplary process 400 of Cross Layer Eigen-Based Beamforming (EBB).

FIG. 4 is a schematic diagram illustrating an exemplary process 400 of Cross Layer Eigen-Based Beamforming (EBB) which may be used to calculate the first precoder matrix $P_c$.

The process 400 includes a first block 401 "obtain QoS requirement of each active UE Bearer from higher layer"; a second block 402 "get each active UE channel information from physical layer" and a third block 403 "calculate the first precoder by all active channel information as well as its scale factor according to its QoS requirement". The first block 401 and the second block 402 may be specific implementation forms of the first block 301 and the second block 302 of the method 300 described above with respect to FIG. 3 or a specific implementation of the reception task of the communication handler 201 as described above with respect to FIG. 2. The third block 403 may be a specific implementation form of the third block 303 of the method 300 described above with respect to FIG. 3 or a specific implementation of the controller task of the controller 203 as described above with respect to FIG. 2.

In the following, specific implementation forms for the processing blocks 401, 402, 403 are described. UE's Quality of Service (QoS) requirement may for example be acquired from QoS Class Identifier (QCI) in each Data Radio Bearer (DRB) by higher layer. For a Signal Radio Bearer (SRB) user, the QoS requirement may be higher than for a DRB user. The UE's channel information may be measured from the physical layer. For example, the eNodeB may measure UE's channel by its Sounding Reference Signal (SRS). Then, for calculating the first precoder matrix $P_c$, both the physical layer information and higher layer QoS requirement may be jointly used.

An example for this cross layer EBB (Eigen-Based Beamforming) is given by equation (2):

$$USV = \frac{1}{N_k N_u} \sum_{u=1}^{N_u} \sum_{j=1}^{N_k} f_u(H_{u,j})^H H_{u,j} \quad (2)$$

where $H_{u,j}$ denotes the normalized frequency domain channel for user u at subcarrier j, and it may be obtained by the Sounding Reference Signal (SRS); $N_k$ is the total SRS subcarrier number for current user; $f_u$ is the scaling factor of the UE QoS requirement. Then $P_c$ may be determined as the first $N_p$ columns of the Eigen matrix $V^H$.

Alternatively, the first precoder matrix $P_c$ may be calculated according to equation (3):

$$USV = \frac{1}{N_k N_u} \sum_{u=1}^{N_u} \sum_{j=1}^{N_k} f_u(h_{u,j})^H h_{u,j} \quad (3)$$

where $h_{u,j}$ indicates the normalized strongest time domain channel cluster.

The scaling factor $f_u$ may be obtained by UE QCI, buffer status, package delay and so on.

In a first alternative, a fixed QCI table may be used to calculate $f_u$, where a user scaling factor $d_u$ may be obtained according to equation (4):

$$d_u = \sum_{i=1}^{N_{RB}} t(QCI_i) \quad (4)$$

where $N_{RB}$ is the total number of Radio Bearer for current user; t( ) indicates a lookup table for QCI scaling value.

Then the scaling factor $f_u$ may be obtained according to equation (5):

$$f_u = \frac{d_u}{\sum_{i=1}^{N_u} d_u} \quad (5)$$

In a first alternative, for each user, the user DRB type, delay or cumulative bit rate may have an impact on the user scaling factor $d_u$, which may be defined according to equation (6) for GBR users and according to equation (7) for non-GBR users:

$$d_{u,GBR} = -t(QCI) \frac{\log_{10} \alpha}{\beta} \times \frac{v_g}{v_c} \quad (6)$$

$$d_{u,non\_GBR} = -t(QCI) \frac{\log_{10} \alpha}{\beta} \times \tau \quad (7)$$

where $\alpha$ indicates the Packet Error Loss Rate (PELR); $\beta$ refers to Packet Delay Budget (PDB); $v_g$ is the guaranteed bit rate; $v_c$ is the cumulative bit rate and $\tau$ is the Head of Line (HoL) delay. PELR and PDB may be indicated by QCI.

In a third alternative, an outer-loop scaling adjustment factor may be used. Each user's beamforming weight may be estimated based on physical layer information, which may contain some errors due to interference and noise. Then, some users may perform a bad beam, and for these users, the scaling factor should be set as a low value. Therefore, an outer-loop scaling adjustment factor may be used according to equation (8):

$$d_u' = \mu_u d_u \quad (8)$$

where $d_u'$ is the user scaling factor taken instead of $d_u$ in equation (5); $\mu_u$ is the outer-loop scaling adjustment factor, which may be influenced by downlink CQI and Block Error Rate (BLER).

Figure 5:
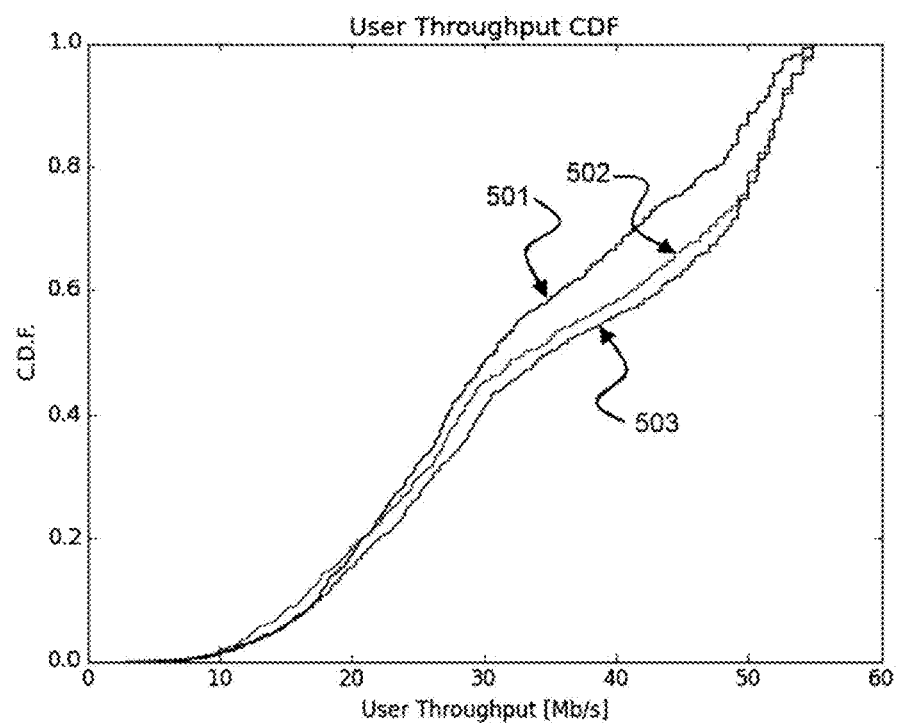
FIG. 5 is a performance diagram illustrating an exemplary cumulative distribution function over user throughput for all user classes.
Figure 6:
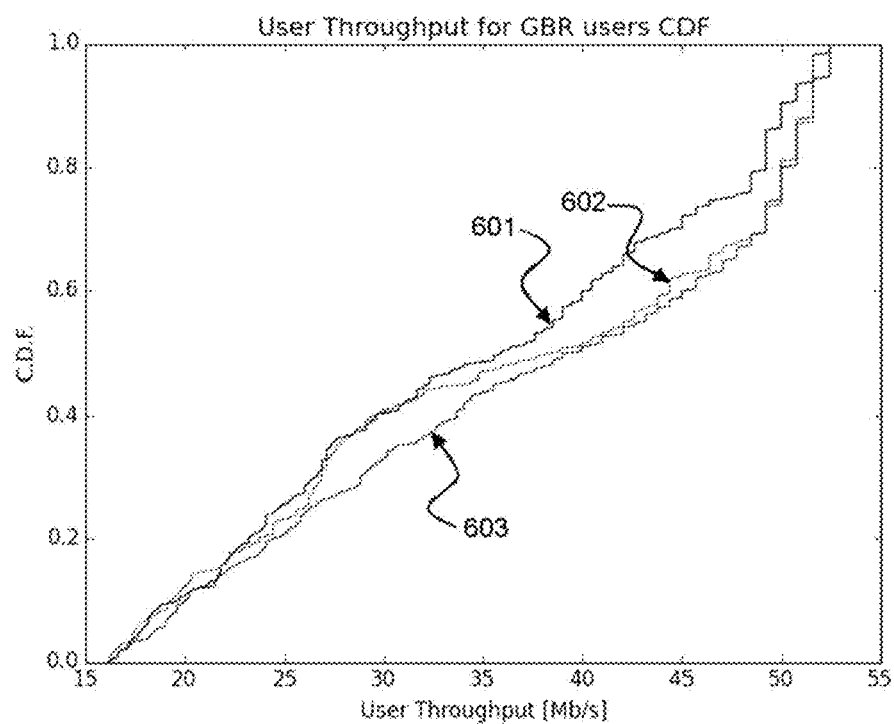
FIG. 6 is a performance diagram illustrating an exemplary cumulative distribution function over user throughput for the class of Guaranteed Bit Rate (GBR) users.

FIG. 5 is a performance diagram illustrating an exemplary cumulative distribution function over user throughput for all user classes and FIG. 6 is a performance diagram illustrating an exemplary cumulative distribution function over user throughput for the class of Guaranteed Bit Rate (GBR) users.

The cumulative distribution function (CDF), or just distribution function, describes the probability that a real-valued random variable X with a given probability distribution will be found to have a value less than or equal to x. In the case of a continuous distribution, it gives the area under the probability density function from minus infinity to x.

The curves 501 and 601 illustrate DFT-based EBB, i.e. beamforming based on fixed weights, e.g. generated by a discrete Fourier Transform vector. The curves 502 and 602 illustrate PHY only EBB, i.e., beamforming considering only physical information, i.e. information of the PHY layer. The curves 503 and 603 illustrate cross layer EBB according to the disclosure, i.e., beamforming considering information of multiple layers such as channel information 202 and QoS information 204 as described above with respect to FIGS. 2 to 4.

In particular, FIG. 5 and FIG. 6 show the system level test results for the Urban Macro-cell (UMa) network case. The test is based on a mixed traffic model in which 40% users are served as Guaranteed Bit Rate (GBR) traffic and 60% users are served as non-GBR traffic (e.g. FTP). For GBR users, those under guaranteed bit rate are considered as outage; for non-GBR users, those with above 8 seconds package delay are considered as outage. It can be observed from the figures that by using cross layer EBB according to the disclosure, higher user throughput can be acquired (see curves 503, 603), especially for GBR users.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 300, 400 as described above with respect to FIGS. 3 and 4. Such a computer program product may include a readable non-transitory storage medium storing program code thereon for use by a processor, the program code comprising instructions for performing any of the methods 300, 400 as described above.

EXAMPLES

The following examples pertain to further embodiments. Example 1 is a device for controlling a plurality of antenna elements of an antenna array of a multi-input multi-output (MIMO) communication system, the device comprising: a communication handler configured to receive channel information from a first user equipment of a plurality of user equipments, the channel information indicating a communication channel quality of the first user equipment, and configured to receive quality of service (QoS) information indicating a QoS requirement for the first user equipment; and a controller configured to generate a plurality of weights for beamforming the plurality of antenna elements based on the channel information and based on the QoS information.

In Example 2, the subject matter of Example 1 can optionally include that the communication handler is configured to receive the QoS information by acquiring one of a Media Access Control (MAC) layer or a core network layer of the MIMO communication system.

In Example 3, the subject matter of any one of Example 1-2 can optionally include that the communication handler is configured to receive the QoS information from a radio bearer of the MIMO communication system assigned to the first user equipment.

In Example 4, the subject matter of Example 3 can optionally include that the communication handler is configured to receive the QoS information from one of a data radio bearer or a signal radio bearer.

In Example 5, the subject matter of any one of Examples 3-4 can optionally include that the communication handler is configured to receive the QoS information from a QoS Class Identifier (QCI) comprised in the radio bearer.

In Example 6, the subject matter of any one of Example 1-5 can optionally include that the communication handler is configured to receive the channel information from a physical layer of the MIMO communication system assigned to the first user equipment.

In Example 7, the subject matter of any one of Example 1-6 can optionally include that the communication handler is configured to receive the channel information by evaluating a Sounding Reference Signal (SRS) of the first user equipment.

In Example 8, the subject matter of any one of Example 1-7 can optionally include that the communication handler is configured to generate a precoder matrix comprising the plurality of weights.

In Example 9, the subject matter of Example 8 can optionally include that the controller is configured to generate the precoder matrix depending on a number of antenna elements and a number of antenna ports of the antenna array.

In Example 10, the subject matter of any one of Examples 8-9 can optionally include that the controller is configured to generate the precoder matrix based on a channel matrix of the user equipment and based on a scaling factor of the QoS requirement for the first user equipment.

In Example 11, the subject matter of Example 10 can optionally include that the controller is configured to generate the precoder matrix based on cross layer Eigen Based Beamforming (EBB).

In Example 12, the subject matter of any one of Examples 10-11 can optionally include that the controller is configured to generate the precoder matrix ($P_c$) based on the relation:

$$USV = \frac{1}{N_k N_u} \sum_{u=1}^{N_u} \sum_{j=1}^{N_k} f_u(H_{u,j})^H H_{u,j}$$

where $H_{u,j}$ denotes the normalized frequency domain channel for the first user equipment u at subcarrier j, obtained by Sounding Reference Signal (SRS), $N_k$ denotes the total SRS subcarrier number for the first user equipment, $N_u$ denotes the number of user equipments served by the antenna array and $f_u$ denotes the scaling factor of the QoS requirement for the first user equipment.

In Example 13, the subject matter of Example 12 can optionally include that the controller is configured to generate the precoder matrix based on a singular value decomposition of the term USV.

In Example 14, the subject matter of any one of Examples 12-13 can optionally include that the controller is configured to generate the precoder matrix based on the first $N_p$ columns of an Eigen matrix $V^H$, where $N_p$ is the number of antenna ports of the antenna array.

In Example 15, the subject matter of any one of Examples 10-14 can optionally include that the controller is configured to generate the scaling factor of the QoS requirement for the first user equipment based on a QoS Class Identifier (QCI) table.

In Example 16, the subject matter of any one of Examples 10-15 can optionally include that the controller is configured to generate the scaling factor of the QoS requirement for the first user equipment based on at least one of a QoS Class Identifier (QCI) table and a total number of radio bearers ($N_{RB}$) assigned to the first user equipment.

In Example 17, the subject matter of any one of Examples 10-16 can optionally include that the controller is configured to generate the scaling factor of the QoS requirement for the first user equipment based on at least one of a Packet Error Lost Rate (PELR) and a Packet Delay Budget (PDB) of the first user equipment.

In Example 18, the subject matter of any one of Examples 10-17 can optionally include that the controller is configured to generate the scaling factor of the QoS requirement for the first user equipment based on an outer-loop scaling adjustment factor.

In Example 19, the subject matter of Example 18 can optionally include that the outer-loop scaling adjustment factor depends on at least one of a downlink channel quality index (CQI) and a block error rate (BLER).

Example 20 is a device for controlling a plurality of antenna elements of an antenna array of a full-dimensional multi-input multi-output (FD-MIMO) communication system, the device comprising: a communication handler configured to receive channel information from at least two User Equipments (UEs), the channel information indicating a communication channel quality of the at least two UEs and configured to receive quality of service (QoS) information indicating a QoS requirement for the at least two UEs; and a controller configured to generate a plurality of weights for beamforming the plurality of antenna elements based on the channel information and based on the QoS information.

In Example 21, the subject matter of Example 20 can optionally include that the controller is configured to generate the plurality of weights for beamforming antenna elements of a two-dimensional antenna array structure which are placed in a vertical and a horizontal direction.

In Example 22, the subject matter of any one of Examples 20-21 can optionally include that the controller is configured to generate the plurality of weights based on cross layer beamforming.

Example 23 is a method for controlling a plurality of antenna elements of an antenna array of a multi-input multi-output (MIMO) communication system, the method comprising: receiving channel information from a plurality of user equipments, the channel information indicating communication channel qualities of the plurality of user equipment; receiving quality of service (QoS) information indicating QoS requirements for the plurality of user equipments; and generating a plurality of weights for beamforming the plurality of antenna elements based on the channel information and based on the QoS information.

In Example 24, the subject matter of Example 23 can optionally include receiving the channel information for active UEs of the plurality of UEs from a physical layer of the MIMO communication system.

In Example 25, the subject matter of any one of Examples 23-24 can optionally include receiving the QoS information for active radio bearers assigned to the plurality of UEs from a communication layer of the MIMO communication system which is higher than a physical layer.

Example 26 is a computer readable non-transitory medium on which computer instructions are stored which when executed by a computer, cause the computer to perform the method of one of Examples 23 to 25.

Example 27 is a device for controlling a plurality of antenna elements of an antenna array of a multi-input multi-output (MIMO) communication system, the device comprising: means for receiving channel information from a plurality of user equipments, the channel information indicating communication channel qualities of the plurality of user equipment; means for receiving quality of service (QoS) information indicating QoS requirements for the plurality of user equipments; and means for generating a plurality of weights for beamforming the plurality of antenna elements based on the channel information and based on the QoS information.

In Example 28, the subject matter of Example 27 can optionally include means for receiving the channel information for active UEs of the plurality of UEs from a physical layer of the MIMO communication system.

In Example 29, the subject matter of any one of Examples 27-28 can optionally include means for receiving the QoS information for active radio bearers assigned to the plurality of UEs from a communication layer of the MIMO communication system which is higher than a physical layer.

Example 30 is a system for controlling a plurality of antenna elements of an antenna array of a multi-input multi-output (MIMO) communication system, the system comprising: a communication handler subsystem configured to receive channel information from a first user equipment of a plurality of user equipments, the channel information indicating a communication channel quality of the first user equipment, and configured to receive quality of service (QoS) information indicating a QoS requirement for the first user equipment; and a controller subsystem configured to generate a plurality of weights for beamforming the plurality of antenna elements based on the channel information and based on the QoS information.

In Example 31, the subject matter of Example 30 can optionally include that the communication handler subsystem is configured to receive the QoS information by acquiring one of a Media Access Control (MAC) layer or a core network layer of the MIMO communication system.

In Example 32, the subject matter of any one of Examples 30-31 can optionally include that the communication handler subsystem is configured to receive the QoS information from a radio bearer of the MIMO communication system assigned to the first user equipment.

In Example 33, the subject matter of Example 32 can optionally include that the communication handler subsystem is configured to receive the QoS information from one of a data radio bearer or a signal radio bearer.

In Example 34, the subject matter of any one of Examples 30-33 can optionally include that the system is implemented as an on-chip system.

Example 35 is a communication circuit for controlling a plurality of antenna elements of an antenna array of a multi-input multi-output (MIMO) communication system, the communication circuit comprising: a communication handler circuit configured to receive channel information from a first user equipment of a plurality of user equipments, the channel information indicating a communication channel quality of the first user equipment, and configured to receive quality of service (QoS) information indicating a QoS requirement for the first user equipment; and a controller circuit configured to generate a plurality of weights for beamforming the plurality of antenna elements based on the channel information and based on the QoS information.

In Example 36, the subject matter of Example 35 can optionally include that the communication handler circuit is configured to receive the QoS information by acquiring one of a Media Access Control (MAC) layer or a core network layer of the MIMO communication system.

In Example 37, the subject matter of any one of Examples 35-36 can optionally include that the communication handler circuit is configured to receive the QoS information from a radio bearer of the MIMO communication system assigned to the first user equipment.

In Example 38, the subject matter of any one of Examples 35-37 can optionally include that the controller circuit is configured to generate the precoder matrix based on a channel matrix of the user equipment and based on a scaling factor of the QoS requirement for the first user equipment.

In Example 39, the subject matter of Example 38 can optionally include that the controller circuit is configured to generate the precoder matrix based on cross layer Eigen Based Beamforming (EBB).

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A device for controlling a plurality of antenna elements of an antenna array of a multi-input multi-output (MIMO) communication system, the device comprising:
communication handler processing circuitry configured to receive channel information from a first user equipment of a plurality of user equipments, the channel information indicating a communication channel quality of the first user equipment, and configured to wirelessly receive, via the MIMO communication system, quality of service (QoS) information indicating a QoS requirement for the first user equipment; and
a micro-controller configured to generate a precoder matrix based on cross layer beamforming that utilizes a channel matrix of the first user equipment and a scaling factor of the QoS requirement for the first user equipment, the precoder matrix comprising a plurality of weights for beamforming the plurality of antenna elements, the plurality of weights being generated based on a combination of the channel information and the QoS information.

2. The device of claim 1, wherein the communication handler processing circuitry is configured to receive the QoS information by acquiring one of a Media Access Control (MAC) layer or a core network layer of the MIMO communication system.

3. The device of claim 1, wherein the communication handler processing circuitry is configured to receive the QoS information from a radio bearer of the MIMO communication system assigned to the first user equipment.

4. The device of claim 3, wherein the communication handler processing circuitry is configured to receive the QoS information from one of a data radio bearer or a signal radio bearer.

5. The device of claim 3, wherein the communication handler processing circuitry is configured to receive the QoS information from a QoS Class Identifier (QCI) comprised in the radio bearer.

6. The device of claim 1, wherein the communication handler processing circuitry is configured to receive the channel information from a physical layer of the MIMO communication system assigned to the first user equipment.

7. The device of claim 1, wherein the communication handler processing circuitry is configured to receive the channel information by evaluating a Sounding Reference Signal (SRS) of the first user equipment.

8. The device of claim 1, wherein the micro-controller is configured to generate the precoder matrix depending on a number of antenna elements and a number of antenna ports of the antenna array.

9. The device of claim 1, wherein the cross layer beamforming includes Eigen Based Beamforming (EBB).

10. The device of claim 1, wherein the micro-controller is configured to generate the precoder matrix based on the relation:

$$USV = \frac{1}{N_k N_u} \sum_{u=1}^{N_u} \sum_{j=1}^{N_k} f_u(H_{u,j})^H H_{u,j}$$

where $H_{u,j}$ denotes the normalized frequency domain channel for the first user equipment u at subcarrier j, obtained by Sounding Reference Signal (SRS), $N_k$ denotes the total SRS subcarrier number for the first user equipment, $N_u$ denotes the number of user equipments served by the antenna array and $f_u$ denotes the scaling factor of the QoS requirement for the first user equipment.

11. The device of claim 10, wherein the micro-controller is configured to generate the precoder matrix based on a singular value decomposition of the term USV.

12. The device of claim 10, wherein the micro-controller is configured to generate the precoder matrix based on the first $N_p$ columns of an Eigen matrix $V^H$, where $N_p$ is the number of antenna ports of the antenna array.

13. The device of claim 1, wherein the micro-controller is configured to generate the scaling factor of the QoS requirement for the first user equipment based on a QoS Class Identifier (QCI) table.

14. The device of claim 1, wherein the micro-controller is configured to generate the scaling factor of the QoS requirement for the first user equipment based on at least one of a QoS Class Identifier (QCI) table and a total number of radio bearers assigned to the first user equipment.

15. The device of claim 1, wherein the micro-controller is configured to generate the scaling factor of the QoS requirement for the first user equipment based on at least one of a Packet Error Lost Rate (PELR) and a Packet Delay Budget (PDB) of the first user equipment.

16. The device of claim 1, wherein the micro-controller is configured to generate the scaling factor of the QoS requirement for the first user equipment based on an outer-loop scaling adjustment factor.

17. The device of claim 16, wherein the outer-loop scaling adjustment factor depends on at least one of a downlink channel quality index (CQI) and a block error rate (BLER).

18. The device of claim 1, wherein the cross layer beamforming includes acquiring the channel information and the QoS information from different respective network layers.

19. A device for controlling a plurality of antenna elements of an antenna array of a full-dimensional multi-input multi-output (FD-MIMO) communication system, the device comprising:
communication handler processing circuitry configured to receive channel information from at least two User Equipments (UEs), the channel information indicating a communication channel quality of the at least two UEs and configured to wirelessly receive, via the FD-MIMO communication system, quality of service (QoS) information indicating a QoS requirement for the at least two UEs; and
micro-controller configured to generate a precoder matrix based on cross layer beamforming that utilizes a channel matrix of the at least two UEs and a scaling factor of the QoS requirement for the at least two UEs, the precoder matrix comprising a plurality of weights for beamforming the plurality of antenna elements, the plurality of weights being generated based on a combination of the channel information and the QoS information.

20. The device of claim 19, wherein the micro-controller is configured to generate the plurality of weights for beamforming antenna elements of a two-dimensional antenna array structure which are placed in a vertical and a horizontal direction.

21. The device of claim 19, wherein the cross layer beamforming includes Eigen Based Beamforming (EBB).

22. A method for controlling a plurality of antenna elements of an antenna array of a multi-input multi-output (MIMO) communication system, the method comprising:

receiving channel information from a plurality of user equipments (UEs), the channel information indicating communication channel qualities of the plurality of UEs;

wirelessly receiving, via the MIMO communication system, quality of service (QoS) information indicating QoS requirements for the plurality of UEs; and generating a precoder matrix based on cross layer beamforming that utilizes a channel matrix of the plurality of UEs and a scaling factor of the QoS requirement for the plurality of UEs, the precoder matrix comprising a plurality of weights for beamforming the plurality of antenna elements, the plurality of weights being generated based on a combination of the channel information and the QoS information.

23. The method of claim 22, comprising:

receiving the channel information for active UEs of the plurality of UEs from a physical layer of the MIMO communication system.

24. The method of claim 22, comprising:

receiving the QoS information for active radio bearers assigned to the plurality of UEs from a communication layer of the MIMO communication system which is higher than a physical layer.

* * * * *